US00RE36317E

United States Patent [19]

Arratia

[11] E Patent Number: Re. 36,317

[45] Reissued Date of Patent: Sep. 28, 1999

[54] INDICATING FUSE BLOCK

[76] Inventor: Jose F. Arratia, 24621 Sinaloa St., Moreno Valley, Calif. 92557

[21] Appl. No.: 09/014,128

[22] Filed: Jan. 27, 1998

Related U.S. Patent Documents

Reissue of:

[64] Patent No.: 5,659,283
Issued: Aug. 19, 1997
Appl. No.: 08/414,332
Filed: Mar. 30, 1995

U.S. Applications

[63] Continuation-in-part of application No. 08/367,394, Dec. 30, 1994, abandoned.

[51] Int. Cl.[6] ..... H01H 85/30; G08B 21/00

[52] U.S. Cl. ..... 337/206; 337/4; 337/265; 340/638; 361/626

[58] Field of Search ..... 337/4, 5, 142, 337/198, 206, 241, 265; 340/635, 638; 361/103, 104, 626, 833

[56] References Cited

U.S. PATENT DOCUMENTS

| | | | |
|---|---|---|---|
| H248 | 4/1987 | Middlebrooks | 340/639 |
| 3,183,327 | 5/1965 | Kozacka | 337/219 |
| 3,253,106 | 5/1966 | Holsinger | 337/157 |
| 3,308,257 | 3/1967 | Thompson | 337/181 |
| 3,621,431 | 11/1971 | Hitchcock, Sr. | 337/5 |
| 3,818,408 | 6/1974 | Andersson | 337/206 |
| 4,025,888 | 5/1977 | Judd | 337/266 |
| 4,382,225 | 5/1983 | Peltz | 324/550 |
| 4,498,077 | 2/1985 | Richardson | 340/648 |
| 4,499,447 | 2/1985 | Greenberg | 337/266 |
| 4,554,607 | 11/1985 | Mora | 361/104 |
| 4,691,197 | 9/1987 | Damiano et al. | 340/638 |
| 4,749,821 | 6/1988 | Linton et al. | 175/35 R |
| 4,815,993 | 3/1989 | Falchetti | 439/622 |
| 4,875,232 | 10/1989 | Shumway | 379/413 |
| 4,887,975 | 12/1989 | Jarred | 439/490 |
| 5,004,995 | 4/1991 | Lo | 337/266 |
| 5,300,913 | 4/1994 | Linton | 337/242 |
| 5,446,440 | 8/1995 | Gleason | 340/331 |

*Primary Examiner*—Leo P. Picard
*Assistant Examiner*—Jayprakash N. Gandhi
*Attorney, Agent, or Firm*—Sheldon & Mak

[57] ABSTRACT

An indicating fuse assembly includes an electrically non-conductive housing; an array of first and second electrically conductive contacts supported by the housing, each pair of first and second contacts being adapted for connecting a replaceable fuse, the contacts being connected in a powered circuit wherein each fuse, when connected between a respective pair of the contacts, is electrically series-connected with a load of the circuit; and a plurality of illuminators electrically connected within the housing for displaying open circuit conditions of corresponding ones of the fuses when the contacts are connected in the powered circuit, electrical current in the illuminators being limited to a minor fraction of a rated current of the corresponding loads. At least some the illuminators can include bipolar pairs of light emitting diodes for activation of the respective illuminators without regard to polarity of the circuit. In a preferred configuration, the assembly also includes a detector driver circuit for sensing activation of any of the illuminators, the detector driver circuit being adapted for [signalling] *signaling* an external circuit. The detector driver circuit can be configured for independently sensing a voltage across each fuse for driving the illuminators with current not flowing in the loads.

15 Claims, 2 Drawing Sheets

INDICATING FUSE BLOCK

Matter enclosed in heavy brackets [ ] appears in the original patent but forms no part of this reissue specification; matter printed in italics indicates the additions made by reissue.

RELATED APPLICATION

This application is a continuation-in-part of application Ser. No. 08/367,394, filed on Dec. 30, 1994, *now abandoned,* which is incorporated herein by this reference.

BACKGROUND

The present invention relates to electrical fuses and fuse blocks such as are used in automobiles, trucks and in a wide variety of electrical and electronic equipment.

Electrical fuses for many medium power applications have a non-conductive housing, a fusible link in the housing, and a pair of electrical contacts extending from external of the housing into electrical contact with opposite sides of the fusible link. Typical fuses of the prior art have the housing translucent for permitting visual inspection of the fusible link. Other fuses have elements that move or change color when the fuse is blown. However, in many situations it is impractical to visually monitor the fuses, such as when a large number of fuses are connected in different circuit portions of a system, and when only limited ambient light is available for inspecting the fuses.

It is also known to provide illuminated indicia of fuse failure as disclosed, for example in U.S. Pat. Nos. 4,382,225 to Peltz and 4,875,322 to Shumway. U.S. Pat. No. 5,300,913 to Liston also discloses light indicators being connected across ferrules of cartridge fuses with reference to U.S. Pat. Nos. 3,432,789 and 3,457,535.

The illuminated fuse fault indicators of the prior art exhibit one or more of the following disadvantages:

1. They are ineffective for use with blade contact fuses and in low voltage DC circuits and/or circuits having very low resistance loads;
2. They are unsuitable in that they are undesirably bulky and/or they require impractical additional wiring in many applications;
3. They are unreliable in that they are subject to damage in ordinary handling;
4. They are unsafe in that they have exposed conductors that are subject to shorting; and
5. They are undesirably expensive to produce.

Thus there is a need for an illuminating fuse fault indicator that avoids the disadvantages of the prior art.

SUMMARY

The present invention meets this need by providing a particularly effective indicating fuse array assembly. In one aspect of the invention, the assembly includes a housing formed of an electrically non-conductive material; an array of first and second electrically conductive contact members extending within the housing for support thereby, each pair of first and second contact members being adapted for connecting a replaceable fuse; means for connecting the contact members in a powered circuit wherein each fuse, when connected between a respective pair of the contact members, is electrically series-connected with a load of the circuit, each load having a rated current; a plurality of illuminators electrically connected within the housing for displaying open circuit conditions of corresponding ones of the fuses when the contact members are connected in the powered circuit; and means for limiting electrical current in the illuminators to a minor fraction of the rated current of the corresponding loads.

At least some of the illuminators can include light emitting diodes. The means for limiting can include a resistor element series-connected with each illuminator. The illuminators and the series resistor elements can be supported within the housing.

Preferably at least some the illuminators include bipolar pairs of light emitting diodes for activation of the respective illuminators without regard to polarity of the circuit. The means for limiting current can include a single resistance element in series with a common connection to a plurality of the illuminators.

Preferably the fuse assembly further includes a detector driver circuit for sensing activation of any of the illuminators, the detector driver circuit being adapted for [signalling] *signaling* an external circuit. The detector driver circuit can be operative for activating a current source to the external circuit for driving a current load thereof. One side of each illuminator can be connected to a respective second contact member of the array, at least some of the first contact members of the array being powered independently of others of the first contact members, the detector driver circuit including means for preventing false activation of the external circuit in the event that only a subset of the first contact members are powered. Preferably the detector driver circuit includes a comparator circuit for comparing a voltage of each load with a reference voltage, activation of the corresponding illuminator being responsive to operation of the comparator circuit, the illuminator being driven by current not required to flow within the load.

DRAWINGS

These and other features, aspects, and advantages of the present invention will become better understood with reference to the following description, appended claims, and accompanying drawings, where:

DESCRIPTION

Figure 1:
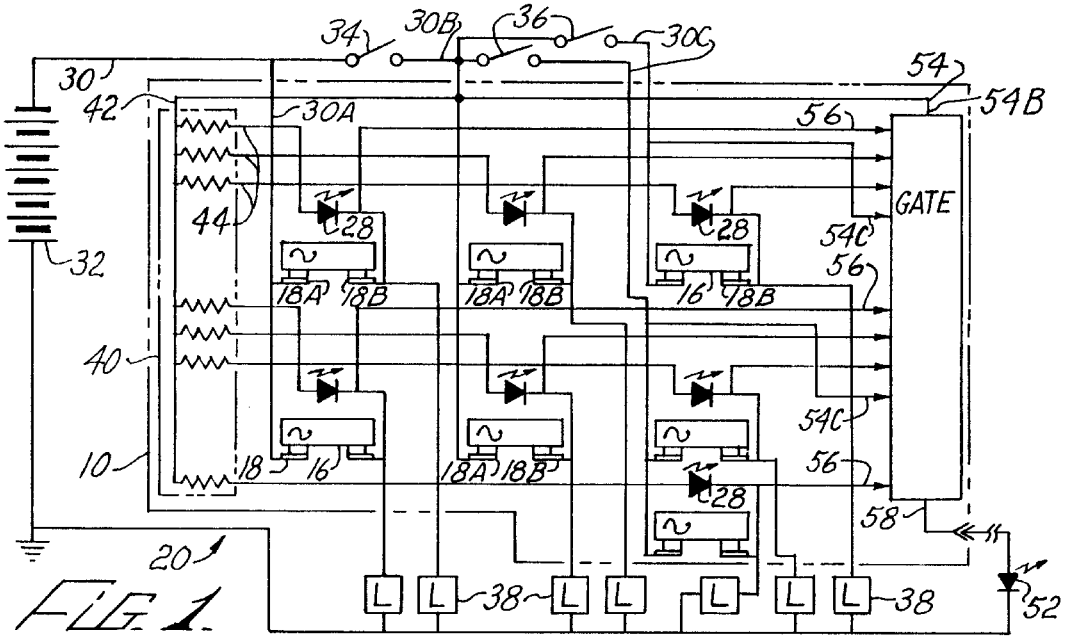
FIG. 1 is a pictorial circuit diagram of a power circuit incorporating an indicating fuse block according to the present invention.

The present invention is directed to an indicating fuse array that is particularly advantageous for use in vehicles and a wide variety of electrical and electronic equipment. With reference to FIGS. 1–5 of the drawings, an indicating fuse assembly 10 includes a block unit 12 having a housing 14 that is adapted to removably receive a plurality of fuses 16, an array of contacts including first contacts 18A and second contacts 18B being supportively located within the housing 14 for electrically connecting the fuses 16 in a predefined circuit 20, the contacts being collectively designated 18. In an exemplary configuration, each fuse 16 includes a body 22, a pair of main contact members 24, and a fusible link 26 electrically connecting the contact members 24, the contact members 24 being supported in fixed approximately parallel-spaced relation by the body 22. The main contact members 24 project below the body 22 for plug connection to the contacts 18.

According to the present invention, the fuse assembly 10 includes a plurality of illuminators 28 connected between respective ones of the first and second contacts 18A and 18B, with means for limiting current in each of the illuminators as described herein. In an exemplary configuration of the fuse assembly 10, the first contacts 18A are connected to one or more supply conductors, generally designated 30, that are fed from an external source such as a vehicle battery 32. Typically, one or more of the first contacts 18A are always powered, being connected to a primary conductor 30A that is connected directly to the battery 32, others of the contacts 18A being connected to a main conductor 30B, a main or ignition switch 34 being connected between the conductors 30A and 30B for activating main portions of the circuit 20. Yet others of the first contacts 18A can be connected to one or more secondary conductors 30C, respective load switches 36 being connected between the main conductor 30B and corresponding ones of the secondary conductors 30C. The switches 34 and 36, as well as a plurality of loads 38 that are protected by respective ones of the fuses 16, are normally remotely located from the fuse assembly 10.

A resistor array 40 is supported within the block unit 12, the array 40 having a bus connection 42 to the main conductor 30B and separate resistance connections 44, the illuminators 28 being connected between respective ones of the resistance connections 44 and corresponding ones of the second contacts 18B for providing a visual indication of current in particular ones of the fuses 16 being interrupted by opening of the links 26 thereof as might occur in an overload situation. Preferably each of the illuminators 28 is physically located in association with the corresponding fuse 16 for direct identification of particular blown fuses 16.

Figure 2:
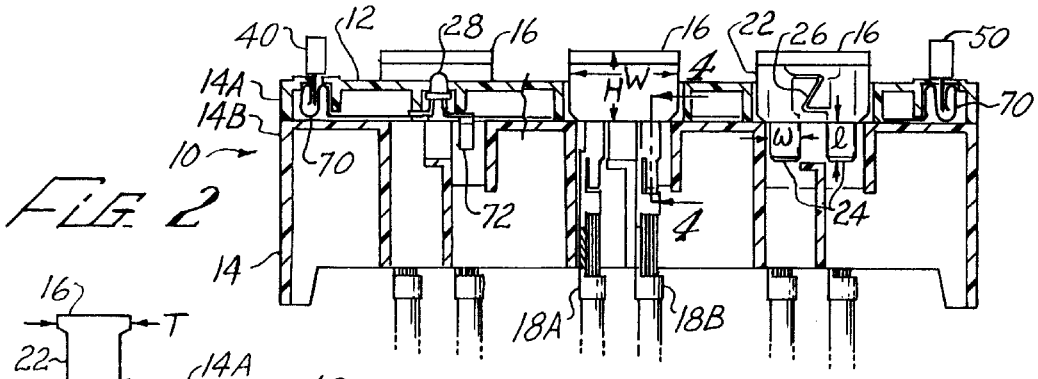
FIG. 2 is a fragmentary sectional elevational view of the fuse block of FIG. 1.
Figure 4:
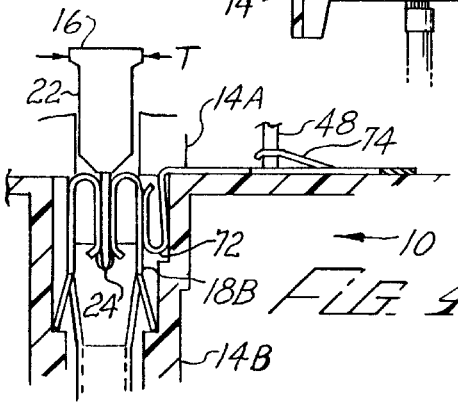
FIG. 4 is a sectional elevational detail view of the fuse block of FIG. 1 on line 4—4 of FIG. 2.
Figure 3:
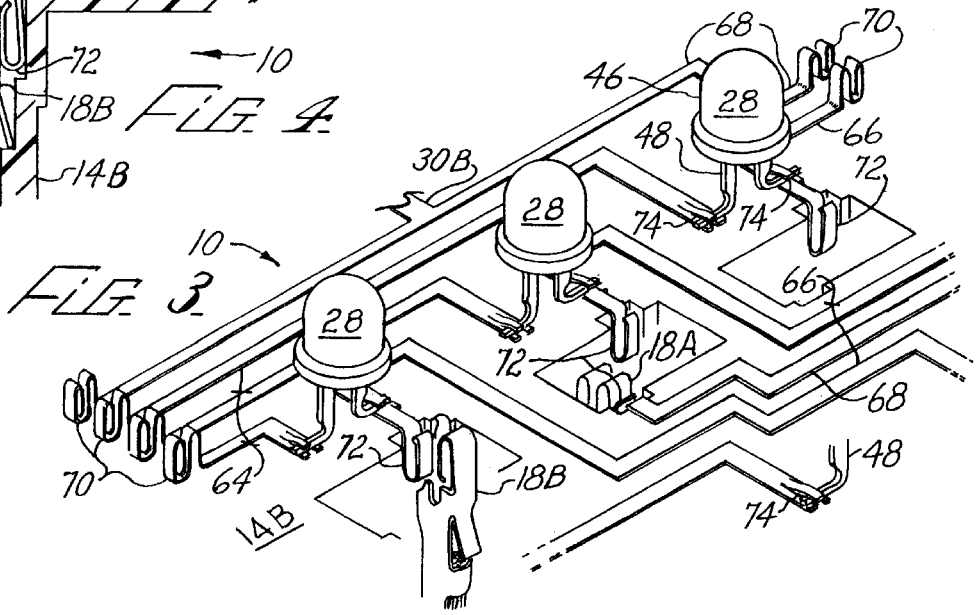
FIG. 3 is an oblique elevational perspective view showing internal connections of the fuse block of FIG. 1.

Each illuminator 28 is preferably a light emitting diode (LED) for high reliability activation in the event of fusing of the link 26 of the associated fuse 16. At least in some applications, the illuminator 28 can be a bipolar LED that is effective regardless of the polarity of either its assembly into the block unit 12 or of power applied to the source conductor 30. Also, the bipolar configuration permits use of the fuse assembly 10 in AC applications. Typically, bipolar LEDs are formed by connecting a pair of polarized LEDs back-to back. The connections between the main conductor 30B, the illuminators 28, the resistor array 40 and the second contacts 18B are formed within the housing 14 for enhanced structural integrity of the fuse assembly 10, and for avoiding exposure of conductors to inadvertent shorting to external objects. In the configuration of FIGS. 2–4, the illuminators 28 project slightly above the housing 14, for enhanced readability of the illuminators 28. Alternatively, the illuminators 28 can be partially of fully enclosed within the housing 14 for enhanced immunity from environmental factors. In the drawings, the illuminator 28 is shown as a device having a domed body 46 and a pair of parallel-spaced leads 48. In practice, the body 46 can have any shape and can be spaced within or partially within the housing 14 as shown in the drawings, or the body 46 can be flush with an outside surface of the housing 14. Moreover, the body 48 can be formed integrally with the housing 12 by providing the illuminators 28 including the leads 48, header and chip(s), then molding the housing 14 from a suitable transparent material so as to encapsulate the illuminators 28.

As thus described, the fuse assembly 10 can be packaged for use with conventional blade-contact fuses of the prior art. In one such configuration, the main contact members 24 project from the body 22 a length l of 0.275 inch, having a width w of 0.20 inch. The body 22 has a height H of 0.48 inch, a width W of 0.75 inch, and a thickness T of 0.2 inch, being formed of a suitable insulative transparent material.

In typical automotive applications the fuse assembly 10 is used with the battery 32 powered at 12 v DC nominally, the voltage ranging upwardly to approximately 14 volts when the battery 32 is being charged. In the event of fuse failure, one or more elements of the resistor array 40 is required to dissipate power according to the current needed for driving the activated illuminators 28 while suitably limiting the current. The power dissipated by one element of the resistor array 40 is the current times the applied voltage less the voltage drop across the one or more illuminators 28 that are activated. Typically, LEDs are formed having a series-pair of silicon p-n junctions such that the voltage drop is approximately 1.4 volts at currents ranging from less than 5 ma to more than 20 ma, a preferred current being approximately 10 ma. Accordingly, a resistance of (14–1.4)v/10 ma=1260 ohms dissipates $[(14-1.4)v]^2/1260 = 0.126$ watts when feeding one of the illuminators 28. It will be understood that in most cases only a single one of the illuminators will be activated at a time, such activation depending on whether the corresponding fuse 16 is blown while the associated load circuit provides a conductive return path to the battery 32. A commercially available array suitable for use as the resistor array 34 is available as No. 899-3-1.2K from BI Technologies, Fullerton, Calif. (seven elements) *from a variety of sources*, being rated at ¼ watt per element. Thus any or all of the elements can safely drive corresponding ones of the illuminators 28 simultaneously at 10 ma.

As further shown in FIGS. 1–3 and 5, a preferred configuration of the fuse assembly 10 includes a detector driver 50 for driving an external indicator 52 whenever any of the illuminators 28 is activated. The detector driver 50 has at least one power connection 54, an exemplary configuration of the driver 50 having power connections designated 54B and 54C in FIG. 1, input connections 56 that are associated with particular ones of the power connections 54, and an output connection 58 to the indicator 52. The power connection 54B is to the main conductor 30B, and the power connections 54C are to respective ones of the auxiliary conductors 30C, the input connections 56 being made to respective ones of the second contacts 18B for the fuses 16 that are powered from corresponding ones of the supply conductors 30, the fuses 16 that are powered from the conductors 30A and 30B being grouped together. The detector driver 50 includes, for each power connection 54, a bipolar transistor having an emitter connection to the power connection 54, a base connection through respective logic diodes 60 to corresponding ones of the input connections 56, and a common collector connection through a current limiting resistor 62 to the output connection 58. Thus the common collector connection is driven toward the potential of the power connection 54B whenever any one of the illuminators 28 is activated.

As further shown in FIGS. 2–4, the housing 14 includes an upper housing 14A and a lower housing 14B, the illuminators 28, the resistor array 40, and the detector driver 50 being associated with the upper housing 14A, the contacts 18 and the supply conductors 30 being associated with the lower housing 14B. The housing portions 14A and 14B can be fixably connected by any suitable means (not shown) including screw fasteners and adhesive bonding. Also associated with the upper housing 14A are a plurality of network conductors 64 between the resistance connections 44 and respective ones of the illuminators 28, input conductors 66 between the second contacts 18B and respective ones of the input connections 56, and power conductors 68 between respective ones of the power connections 54 (and the bus connection 42) and corresponding ones of the first contacts 18A. As best shown in FIG. 3, the connections to the resistor array 40 and the detector driver 50 are implemented by respective double spring loops 70 that are formed for grippingly receiving corresponding lead pins of the associated devices. The connections to the contacts 18 are similarly implemented by single spring loops 72 that are biasingly retained between the associated contact 18 and the lower housing 14B. Connections to the illuminators 28 are effected by forked formations 74 of the respective conductors 64 and 66 that grippingly receive corresponding leads 48 of the illuminators 28. In the configuration of FIGS. 2–4, the resistor array 40 and the detector circuit 50 project slightly above the housing 14, for facilitating possible replacement of the resistor array 40 and the detector driver 50. Alternatively, either or both of these components can be partially of fully enclosed within the housing 14 for enhanced immunity from environmental factors.

Figure 6:
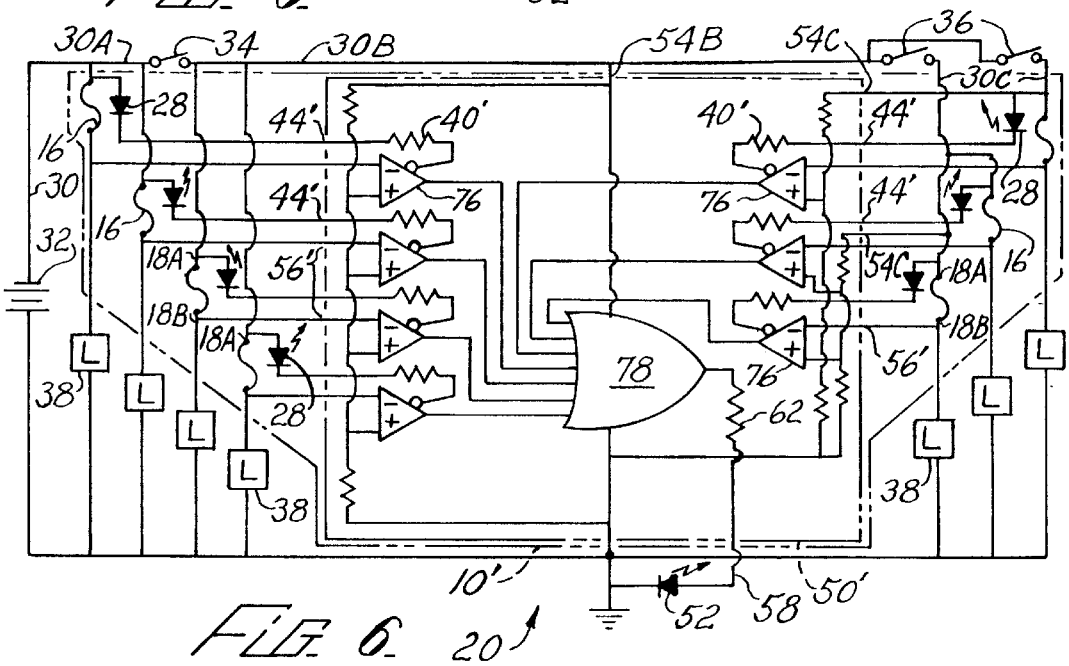
FIG. 6 is a pictorial circuit diagram showing an alternative configuration of the fuse block of FIG. 1.

With further reference to FIG. 6, an alternative configuration of the fuse assembly, designated 10', provides independent voltage detection for open-circuit conditions of the various fuses 16. A counterpart of the detector driver, designated 50', includes a separate voltage comparator 76 for each of the fuses 16, each of the comparators 76 having a reference voltage input (+) and an input (−) from a counterpart of the input connection, designated 56', each of the connections 56' being made to a corresponding second contact 18B. The voltage comparators 76 are configured for sinking current for the illuminators 28, the detector driver 50' incorporating current limiting means 40' and corresponding counterparts of the resistance connections, designated 44'. The connections 44' are to respective cathodes of the illuminators 28, the anodes thereof being connected to corresponding first contacts 18A of the fuses 16. The a reference voltage divider for the comparators 76 that are associated with the fuses 16 on the primary conductor 30A and the main conductor 30B are fed from the conductor 30B through the power connection 54B. However, counterpart circuits associated with the fuses 16 on the secondary conductors 30C are fed from the corresponding power connections 54C for preventing false activation of the associated comparators 76 when the corresponding load switches 36 are open. The detector driver 50' also includes a multiple-input OR gate 78 that is responsive to each of the comparators 76 and having current source capability for feeding the external indicator 52 through the limiting resistor 62 whenever any of the comparators 76 are activated. The principal advantage of this configuration of the fuse block 10' is that the loads 38 are not required to sink the drive current of the respective illuminators 28. The comparators 76 can have a very high input impedance so that the presence of substantially any load conductivity within a particular load 38 is effective for causing illumination of the respective illuminator 28 when the corresponding fuse 16 is open, provided only that the main switch 34 is closed (and in appropriate cases, the associated load switch 36 is also closed). Another advantage is that the function of the resistor array 40 is incorporated within the detector driver 50', thereby simplifying packaging of the fuse block 10'. It will be understood that separate source current connections and reference voltage dividers can be provided for each of the voltage comparators 76, so that a single configuration of the detector driver 50' having a sufficient number of the comparators 76 can be used regardless of the number of secondary conductors 30C and fuses 16 associated therewith.

Figure 7:
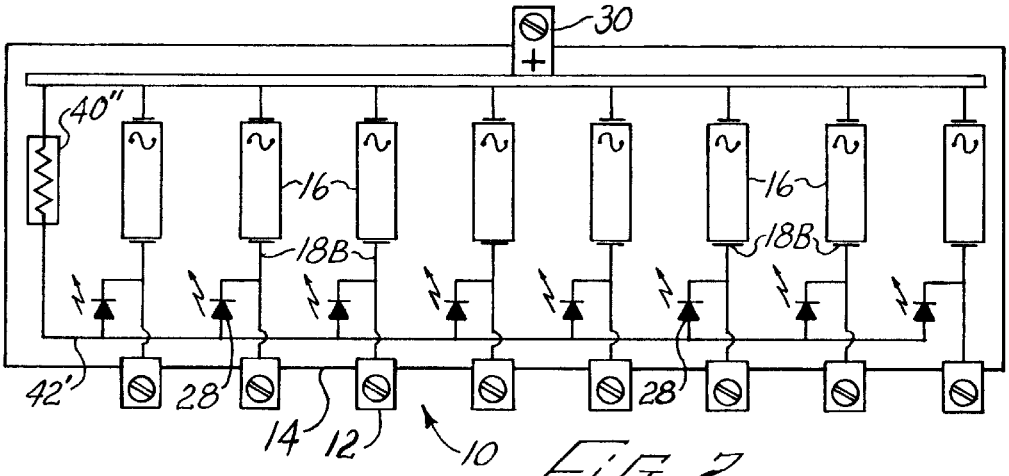
FIG. 7 is a pictorial circuit diagram showing another alternative configuration of the fuse block of FIG. 1.
Figure 5:
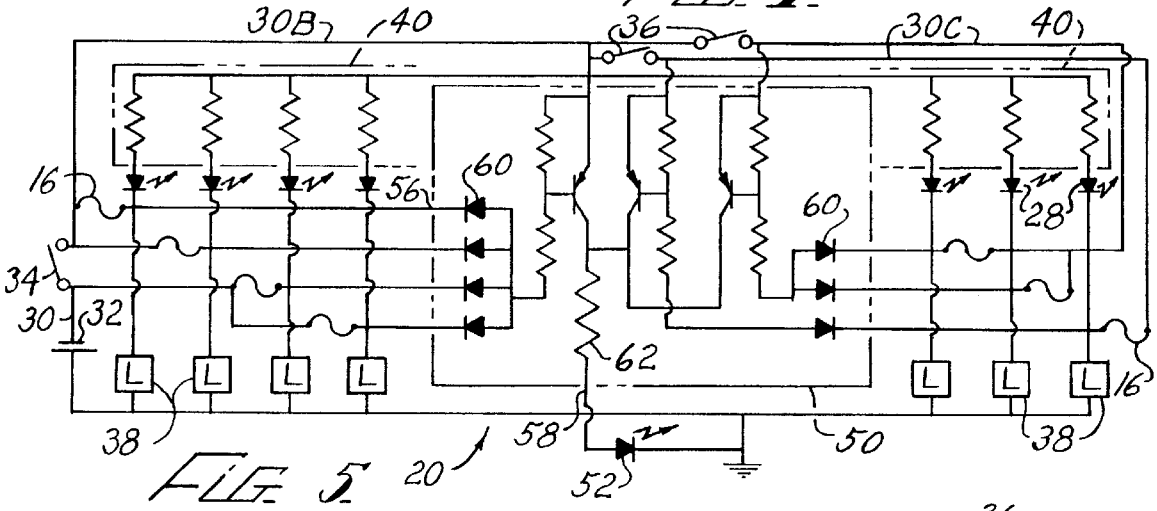
FIG. 5 is a partial circuit diagram of a gate element of the fuse block of FIG. 1 in the circuit thereof.

With further reference to FIG. 7, another alternative configuration of the fuse assembly 10 has a single resistor 40" connected between the supply conductor 30 and a limiting conductor 42', a plurality of the illuminators 28 being connected between the limiting conductor 42' and respective ones of the second contact 18B. In this embodiment of the present invention, the illuminators 28 will always be activated within the range of 5 ma to 20 ma, assuming that there is no "current hogging" when the resistor 40" is selected for powering a single illuminator 28 at 20 ma, as long as the battery 32 provides 14 volts, the load circuits have resistances that are insignificant relative to the resistance of the resistor 40", and not more than four of the illuminators 28 are activated at a time. Similarly, with the battery 32 supplying 12 volts, three of the illuminators 28 would be activated at (12−1.4)v/(3)630 ohms=5.6 ma. With four of the illuminators 28 activated, the average current drops to 4.2 ma, and the resistor 40" dissipates $[(14-1.4)v]^2/630=0.252$ watts at full voltage. Thus the resistor 40" can be appropriately configured for a power rating of ½ watt. It will be understood that in the configuration of FIG. 6, the use of incandescent lamps or bipolar LEDs would be inappropriate due to shorting current paths between the illuminators 28.

Although the present invention has been described in considerable detail with reference to certain preferred versions thereof, other versions are possible. For example, the resistor network 40 (or the resistor 40") can be selected for other current limitations and/or for use in circuits having other voltages. Also, each illuminator 28 can be provided as a flashing LED for reduced power dissipation by the resistor array 40 (or the resistor 40"), and for attracting the attention of those monitoring the fuse assembly 10. Moreover, a LED having an integral resistor can be substituted in the configurations of FIGS. 1–6. An LED having an integral resistor and suitable for the present invention is available as 2RD-xxx from Dialight of Manasaquan, N.Y. The detector driver 50' can incorporate low current sources for biasing the fuses 16 that are fed from the secondary conductors 30C, for providing visual indications of fuse failure even when the corresponding circuitry is unpowered. In the circuit configuration of FIG. 5, the resistor array 40 can be combined with the detector driver 50. Therefore, the spirit and scope of the appended claims should not necessarily be limited to the description of the preferred versions contained herein.

What is claimed is:

1. An indicating fuse assembly comprising:

(a) a housing formed of an electrically non-conductive material;

(b) an array of first and second electrically conductive contact members extending within the housing for support thereby, each pair of first and second contact members being adapted for connecting a replaceable fuse;

(c) means for connecting the contact members in a powered circuit wherein each fuse, when connected between a respective pair of the contact members, is electrically series-connected with a load of the circuit, each load having a rated current, at least some of the first contact members of the array being powered independently of others of the first contact members;

(d) a plurality of illuminators electrically connected within the housing for displaying open circuit conditions of corresponding ones of the fuses when the contact members are connected in the powered circuit, one side of each illuminator being connected to a respective second contact member of the array;

(e) means for limiting electrical current in the illuminators to a minor fraction of the rated current of the corresponding loads; and (f) a detector driver circuit for sensing activation of any of the illuminators, the detector driver circuit being adapted for [signalling] *signaling* an external circuit, the detector driver circuit including means for preventing false activation of the external circuit in the event that only a subset of the first contact members are powered.

2. The fuse assembly of claim 1, wherein at least some of the illuminators comprise light emitting diodes.

3. The fuse assembly of claim 2, wherein the means for limiting comprises a resistor element series-connected with each illuminator.

4. The fuse assembly of claim 3, wherein the illuminators and the series resistor elements are supported within the housing.

5. The fuse assembly of claim 2, wherein at least some the illuminators comprise bipolar pairs of light emitting diodes for activation of the respective illuminators without regard to polarity of the circuit.

6. The fuse assembly of claim 1, wherein the means for limiting current comprises a single resistance element in series with a common connection to a plurality of the illuminators.

7. The fuse assembly of claim 1, wherein the detector driver circuit is operative for activating a current source to the external circuit for driving a current load thereof.

8. An indicating fuse assembly comprising:

(a) a housing formed of an electrically non-conductive material;

(b) an array of first and second electrically conductive contact members extending within the housing for support thereby, each pair of first and second contact members being adapted for connecting a replaceable fuse;

(c) means for connecting the contact members in a powered circuit wherein each fuse, when connected between a respective pair of the contact members, is electrically series-connected with a load of the circuit, each load having a rated current;

(d) a plurality of illuminators electrically connected within the housing for displaying open circuit conditions of corresponding ones of the fuses when the contact members are connected in the powered circuit;

(e) means for limiting electrical current in the illuminators to a minor fraction of the rated current of the corresponding loads; and (f) [a detector driver circuit for sensing activation of any of the illuminators, the detector driver circuit being adapted for signalling an external circuit, the detector driver circuit comprising] a comparator circuit for comparing a voltage of each load with a reference voltage, activation of the corresponding illuminator being responsive to operation of the comparator circuit, the illuminator being driven by current not required to flow within the load.

9. The fuse assembly of claim 8, wherein at least some of the illuminators comprise light emitting diodes.

10. The fuse assembly of claim 9, wherein the means for limiting comprises a resistor element series-connected with each illuminator.

11. The fuse assembly of claim 10, wherein the illuminators and the series resistor elements are supported within the housing.

12. The fuse assembly of claim 9, wherein at least some the illuminators comprise bipolar pairs of light emitting diodes for activation of the respective illuminators without regard to polarity of the circuit.

13. The fuse assembly of claim 8, wherein the means for limiting current comprises a single resistance element in series with a common connection to a plurality of the illuminators.

14. The fuse assembly of claim [8] *15*, wherein the detector driver circuit is operative for activating a current source to the external circuit for driving a current load thereof.

*15. The fuse assembly of claim 8, further comprising a detector driver circuit for sensing activation of any of the illuminators, the detector driver circuit being adapted for signaling an external circuit in response to operation of the comparator circuit.*

* * * * *